Figure 1:
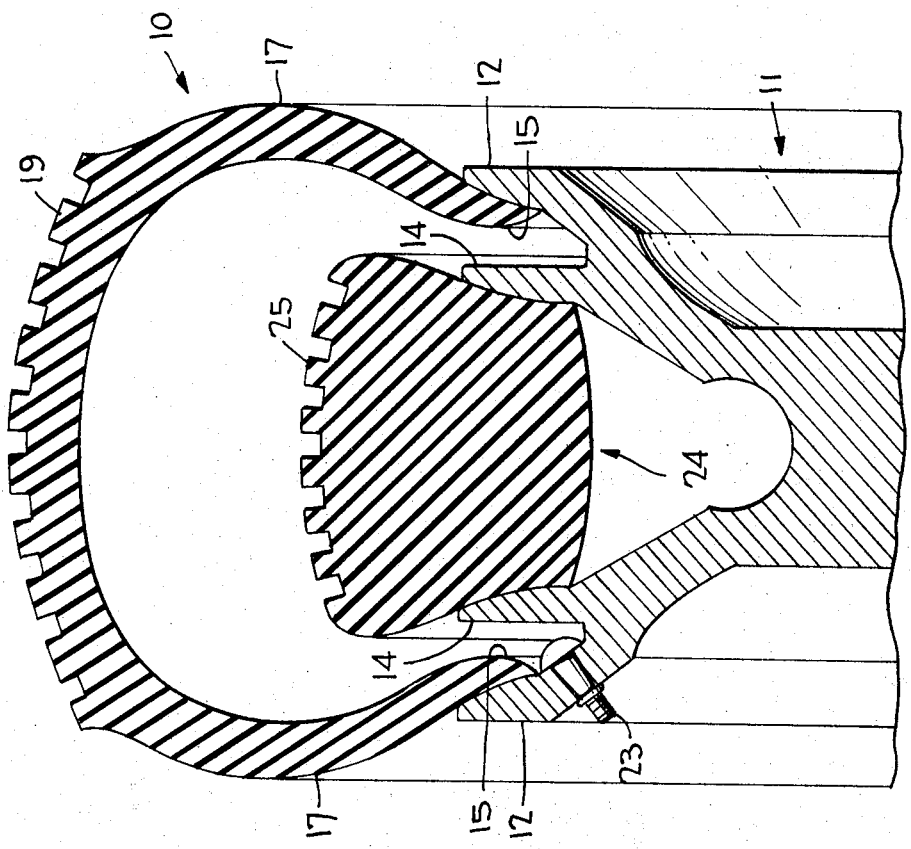

United States Patent
Betancourt L.

[11] 3,844,325
[45] Oct. 29, 1974

[54] DUAL PNEUMATIC TIRE CASINGS

[76] Inventor: Victor Manuel Betancourt L., Pedro Laplace No. 30 Col. Anzures, Mexico City, Mexico

[22] Filed: July 31, 1973

[21] Appl. No.: 384,261

[30] Foreign Application Priority Data
July 31, 1973   Mexico........................... 137392
July 31, 1972   Mexico............................. 11171

[52] U.S. Cl.................. 152/158, 152/340, 152/379
[51] Int. Cl............................................. B60c 5/06
[58] Field of Search ........... 152/158, 331, 334, 339, 152/340, 341, 342, 337, 338, 375, 376, 379, 380, 415; 301/39 T

[56] References Cited
UNITED STATES PATENTS
2,680,463   6/1954   Khalil................................. 152/339
3,426,821   2/1969   Boileau........................... 152/358 X

*Primary Examiner*—Robert B. Reeves
*Assistant Examiner*—Larry Martin
*Attorney, Agent, or Firm*—Watson, Cole, Grindle & Watson

[57] ABSTRACT

A pneumatic tire for a vehicle wheel having a rim with an outer pair of annular bead flanges and an inner pair of bead flanges, an outer casing mounted on the rim between the outer flanges and a separate inner casing mounted on the rim between the inner flanges, a tire inflation valve mounted on the rim for inflating the outer casing, a separate tire inflation valve mounted on the rim for independently inflating the inner casing whereby, in the event of failure of the outer casing, the inner inflated casing functions to safely support the vehicle. As an alternative, the inner casing may comprise a solid tire of elastomeric material thereby eliminating the need for the inner tire inflation valve.

2 Claims, 2 Drawing Figures

PATENTED OCT 29 1974   3,844,325

DUAL PNEUMATIC TIRE CASINGS

This invention relates generally to pneumatic tires and more particularly to such tires having inner and outer casings.

In the standard pneumatic tubeless tire casing, failure of the tire to maintain a safe pressure level depends on any number of different factors. The tire may become overheated, especially for vehicles such as trucks and buses, or the tire may become punctured or lacerated from some object lying on the roadway. Violent bursting of the tire may be contributed by uneven wearing thereof, large or sharp objects on the roadway, etc. Under such circumstances, the sudden loss of air prevents a dual problem — contact between the metal rim and the pavement, and loss of stability of the vehicle. The first of these problems promotes a "binding" by interlocking of the metal rim with the pavement. Obviously, instability is caused by the abrupt reaction of the vehicle to the deflated tire. Of course, any loss in air pressure for the tire while the vehicle is standing still presents no problem. At high speeds, however, any violent bursting of the tire casing subjects the vehicle occupants to great danger.

Heretofore, the structure of the tire casing itself has been reinforced to avoid the danger of sudden blowout. However, it has been noted that the cause of many fatal accidents is due nevertheless to the failure of such reinforced tire casings themselves.

An object of the present invention is to provide a pneumatic tire for a vehicle wheel so constructed that accidents are avoided when the structure of the tire casing fails as the result of a blowout. Any possible interlock between the metal rim and the pavement during blowout is also avoided by this invention.

Another object is to provide such a pneumatic vehicle tire and wheel wherein the wheel rim has an outer pair of annular and radially extending flanges along with an inner pair of such flanges, an outer pneumatic tire casing mounted between the outer flanges and an inner pneumatic tire casing mounted between the inner flanges, separate tire inflation valves mounted on the rim for each of the casings whereby the inner tire casing continues to safely support the vehicle even in the event of blowout of the outer casing.

A further object of this invention is to provide such a pneumatic vehicle tire and wheel wherein the inner casing is instead a solid tire of elastomeric material having a tread wall, thereby functioning to bring the vehicle to a safe stop in the event of blowout of the outer casing.

A still further object is to provide such a pneumatic vehicle tire and wheel wherein the inner pneumatic tire casing is so dimensioned and is pressurized at a higher level as compared to the outer casing so that its tread wall contacts the inner surface of the tread wall of the outer casing.

Figure 2:
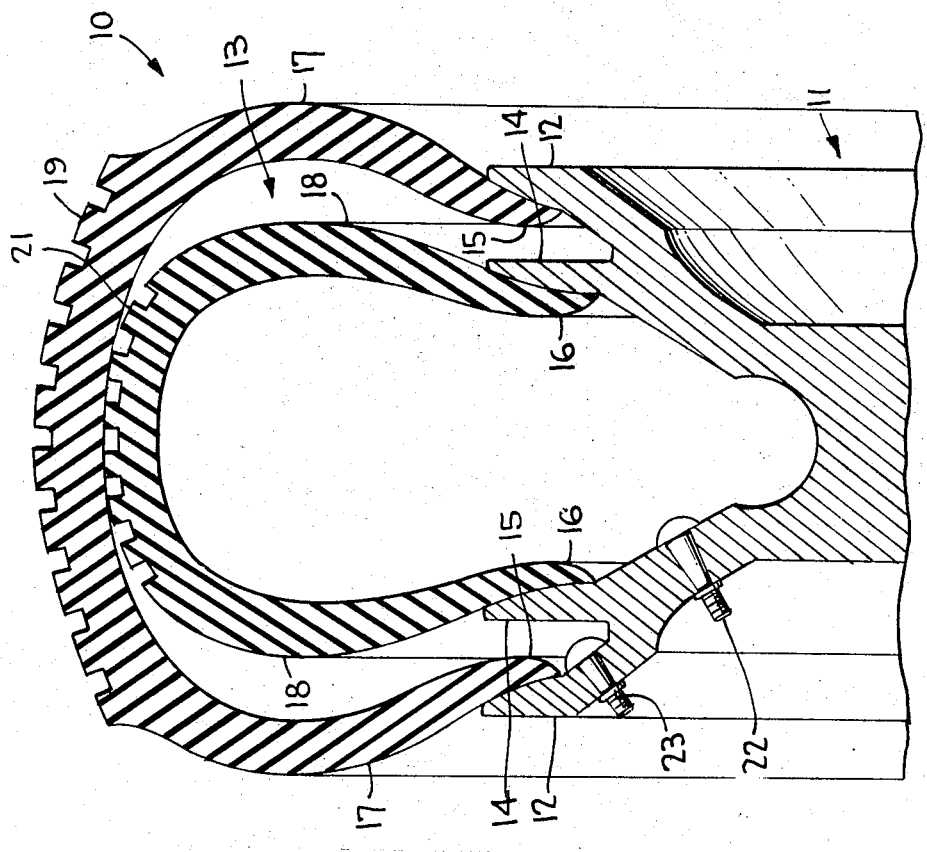

Other objects, advantages and novel features of the invention will become apparent from the following detailed description of the invention when taken in conjunction with the accompanying drawings wherein:

FIG. 1 is a cross-sectional view showing a portion of a dual tire unit including the wheel rim in accordance with the present invention; and FIG. 2 is a view similar to FIG. 1 showing another embodiment of the present invention.

Turning now to the drawings wherein like reference characters refer to like and corresponding parts throughout the several views, a tire unit in accordance with the invention includes an outer tire casing 10 shown in FIG. 1 mounted on wheel rim 11 between an outer pair of annular and radially extending flanges 12. This tire unit further includes an inner tire casing 13 also mounted on the wheel rim between an inner pair of annular and radially extending flanges 14. The outer tire casing is provided with the standard peripheral bead sections 15 to facilitate its mounting on the wheel rim, and the inner tire casing is likewise provided with the standard bead sections 16 to facilitate its mounting on the wheel rim. Each of the tire casings respectively has its sidewalls 17 and 18 interconnecting their respecting bead sections 15, 16 with ground-engaging tread walls 19 and 21. Both tire casings are of a conventional design of elastomeric composition and the carcass structure of each casing may be similar or different, depending on the profiles intended. For example, both casings may include carcasses composed of radially directed cords with the standard number of plies although the specific details thereof are not shown in the drawings in the interest of clarity.

Wheel rim 11 is normally of a metallic construction having mounted thereon a first tire inflation valve 22 located between one pair of the inner flanges 14 for inflating inner casing 13 from any conventional source of compressed air (not shown). Also, a second tire inflation valve 23 is mounted on the wheel rim between one pair of outer and inner flanges 12, 14 for inflating the tire casing 10 independently of the tire casing from any conventional compressed air source, also not shown.

In the FIG. 1 embodiment, inner flanges 14 are spaced inwardly from outer flanges 12 and the inner casing is so as to obtain a greater height and narrower width thereof as compared to the height and width of the outer casing. Also, the inner casing is inflated at a higher positive pressure as compared to the pressure within the outer casing so as to insure a positive contact between tread wall 21 of the inner casing and the inner surface of tread wall 19. By reason of the slender construction of the inner casing, sidewalls 18 thereof will remain spaced apart from the inner surfaces of sidewalls 17 of the outer casing, as shown.

Upon failure of outer casing 10 as by blowout due to puncture or severe wear, the tire unit will not experience any significant loss of pressure because of the higher pressure in the smaller inner casing versus the lower pressure in the larger outer one.

In lieu of an inflatable elastomeric inner casing such as 18 shown in FIG. 1, a solid inner tire ring 24 of elastomeric material may be mounted between inner flanges 14 in a manner as shown in FIG. 2. Wheel rim 11 and outer casing 10 are otherwise identical to that shown in the FIG. 1 embodiment except that tire inflation valve 22 may now be omitted. In the FIG. 2 arrangement, the ground-engaging tread wall 25 of inner ring 24 remains spaced a distance apart from the inner surface of tread wall 19 of the outer casing while said casing is inflated. Accordingly, the use of such an elastomeric inner ring 24 will serve to avoid any interlocking between the wheel rim and the pavement and will reduce the instability of the vehicle to some extent in the event of tire failure of the outer casing as a result of puncture or severe wear.

From the foregoing, it can be seen that a simple yet reliable pneumatic vehicle tire and wheel assembly has been devised whereby vehicle accidents may be avoided or at least minimized with the provision of the dual casing arrangement.

Obviously, many modifications and variations of the invention are made possible in the light of the above teachings. It is therefore to be understood that within the scope of the appended claims, the invention may be practiced otherwise than as specifically described.

What is claimed is:

1. A pneumatic vehicle tire and wheel, comprising a wheel rim having an outer pair of annular and radially extending flanges, an inner pair of annular and radially extending flanges respectively spaced from said outer flanges, an outer pneumatic tire casing having beads, sidewalls and a ground-engaging tread wall, said beads engaging said outer flanges, a separate inner pneumatic tire casing having beads, sidewalls and a ground-engaging tread wall, said inner casing beads engaging said inner flanges, a tire inflation valve mounted on said rim between one of said inner and outer flanges for inflating said outer casing, another tire inflation valve mounted on said rim inwardly of one of said inner flanges for inflating said inner tire casing, said sidewalls of said inner and outer tire casings between spaced apart while said tread walls of said inner and outer casings are in contact with one another upon inflation of both said casings.

2. A pneumatic vehicle tire and wheel, comprising a wheel rim having an outer pair of annular and radially extending flanges, an inner pair of annular and radially extending flanges respectively spaced from said outer flanges, an outer pneumatic tire casing having beads, sidewalls and a ground-engaging tread wall, said beads engaging said outer flanges, a separate inner tire of solid elastomeric material having a ground-engaging tread wall and being engaged between said inner flanges, a tire inflation valve on said rim between one of said inner and outer flanges, and said ground-engaging tread walls being spaced apart.

* * * * *